US011465370B2

(12) United States Patent
Mishima et al.

(10) Patent No.: US 11,465,370 B2
(45) Date of Patent: Oct. 11, 2022

(54) METHOD FOR MANUFACTURING MOLDED ARTICLE AND MANUFACTURING DEVICE (71) Applicant: Mitsubishi Gas Chemical Company, Inc., Tokyo (JP)

(72) Inventors: Shogo Mishima, Kani (JP); Nobuki Hirooka, Yokohama (JP); Nobuhiko Matsumoto, Hiratsuka (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 326 days.

(21) Appl. No.: 16/629,271

(22) PCT Filed: Jun. 11, 2018

(86) PCT No.: PCT/JP2018/022267
§ 371 (c)(1),
(2) Date: Jan. 7, 2020

(87) PCT Pub. No.: WO2019/012886
PCT Pub. Date: Jan. 17, 2019

(65) Prior Publication Data
US 2020/0207030 A1 Jul. 2, 2020

(30) Foreign Application Priority Data

Jul. 13, 2017 (JP) .............................. JP2017-136894

(51) Int. Cl.
*B29C 69/02* (2006.01)
*B33Y 10/00* (2015.01)
(Continued)

(52) U.S. Cl.
CPC ............ *B29C 69/02* (2013.01); *B29C 64/118* (2017.08); *B29C 64/165* (2017.08); *B29C 70/68* (2013.01);
(Continued)

(58) Field of Classification Search
CPC ..... B29C 64/118; B29C 64/165; B29C 69/02; B29C 70/382; B29C 70/42; B29C 70/68;
(Continued)

(56) References Cited

U.S. PATENT DOCUMENTS 5,134,569 A * 7/1992 Masters ................ B29C 64/106
425/162
5,721,031 A 2/1998 Echigo et al.
(Continued)

FOREIGN PATENT DOCUMENTS

CN 1113650 A 12/1995
CN 102027384 A 4/2011
(Continued)

OTHER PUBLICATIONS

International Preliminary Report on Patentability and Written Opinion for PCT/JP2018/022267, dated Jul. 24, 2018, and English Translation submitted herewith (9 pages).
(Continued)

*Primary Examiner* — Manley L Cummins, IV
(74) *Attorney, Agent, or Firm* — Fitch, Even, Tabin & Flannery LLP (57) ABSTRACT

Provided are: a method for manufacturing a molded article having high compressive strength and excellent appearance by compressing a shaped article obtained using a 3D printer, and a material containing another resin; and a manufacturing device for the same. The method for manufacturing a molded article includes: shaping a filament containing a resin and continuous reinforcing fibers using a 3D printer; and manufacturing a molded article by compressing a second material containing resin against a shaped article formed by the shaping, wherein the shaped article has a void ratio of from 5 to 30%.

15 Claims, 4 Drawing Sheets

(51) Int. Cl.
    *B33Y 30/00*     (2015.01)
    *B29C 64/165*     (2017.01)
    *B29C 64/118*     (2017.01)
    *B29C 70/68*     (2006.01)
    *B29K 77/00*     (2006.01)
    *B29K 105/08*     (2006.01)
    *B29K 307/04*     (2006.01)
    *B29C 70/38*     (2006.01)
    *B29C 70/42*     (2006.01)

(52) U.S. Cl.
    CPC ............... *B33Y 10/00* (2014.12); *B33Y 30/00* (2014.12); *B29C 70/382* (2013.01); *B29C 70/42* (2013.01); *B29K 2077/00* (2013.01); *B29K 2105/0881* (2013.01); *B29K 2307/04* (2013.01)

(58) Field of Classification Search
    CPC ........ B29K 2077/00; B29K 2105/0881; B29K 2307/04; B33Y 10/00; B33Y 30/00
    See application file for complete search history.

(56) References Cited

U.S. PATENT DOCUMENTS

| | | | | |
|---|---|---|---|---|
| 5,936,861 | A * | 8/1999 | Jang | B33Y 30/00 700/98 |
| 6,153,034 | A * | 11/2000 | Lipsker | B33Y 70/00 156/167 |
| 9,751,263 | B2 * | 9/2017 | Atwood | B29C 70/78 |
| 11,117,312 | B2 * | 9/2021 | Nakai | D02G 3/402 |
| 2011/0194304 | A1 | 8/2011 | Han et al. | |
| 2014/0061974 | A1 * | 3/2014 | Tyler | B29C 64/118 264/401 |
| 2014/0232035 | A1 * | 8/2014 | Bheda | B29C 64/10 425/375 |
| 2015/0182811 | A1 | 7/2015 | Bender | |
| 2016/0185050 | A1 | 6/2016 | Topolkaraev et al. | |
| 2017/0072631 | A1 * | 3/2017 | Gallucci | G01N 33/442 |
| 2017/0120519 | A1 | 5/2017 | Mark | |

FOREIGN PATENT DOCUMENTS

| | | |
|---|---|---|
| CN | 204582456 U | 8/2015 |
| CN | 105196545 A | 12/2015 |
| CN | 105765137 A | 7/2016 |
| JP | 2015-221511 A | 12/2015 |
| JP | 2016-518267 A | 6/2016 |
| JP | 2017-502805 A | 1/2017 |
| WO | 2014/153535 A2 | 9/2014 |
| WO | 2015/040399 A1 | 3/2015 |
| WO | 2015/061855 A1 | 5/2015 |

OTHER PUBLICATIONS

International Search Report for PCT/JP2018/022267, dated Jul. 24, 2018, and English Translation submitted herewith (3 pages).
Office Action issued in corresponding Chinese Application No. 201880046072.6 dated Mar. 1, 2021 (6 pages).
Extended European Search Report issued in corresponding European Application No. 18831002.3 dated Jul. 6, 2020 (8 pages).

* cited by examiner

METHOD FOR MANUFACTURING MOLDED ARTICLE AND MANUFACTURING DEVICE

CROSS-REFERENCE TO RELATED APPLICATIONS

This application is a U.S. national phase application filed under 35 U.S.C. § 371 of International Application Number PCT/JP2018/022267, filed Jun. 11, 2018, designating the United States, which claims priority from Japanese Application Number 2017-136894, filed Jul. 13, 2017.

Field of the Invention

The present invention relates to a method for manufacturing a molded article and a device for manufacturing the same. In particular, the present invention relates to a manufacturing method for obtaining a molded article by further processing a shaped article formed with a 3D printer.

A 3D printer is one type of a rapid prototyping device (three-dimensional shaping machine) and is a three-dimensional printer that produces a shaped article (three-dimensional article) made of plastic or the like using 3D data such as CAD and CG data created on a computer as a design diagram.

3D printers are classified according to the lamination method. Specifically, inkjet UV curing type 3D printers (for example, CONNEX and EDEN available from Objet Geometries Ltd., and AGILISTA-3000 available from Keyence Corporation, etc.) that use an acrylic-substrated photocurable resin are known. Furthermore, fused deposition type 3D printers (for example, the FORTUS Series, Dimension Series, and uPrint Series available from Stratasys Ltd., and Solidoodle3 available from Solidoodle LLC) that use a thermoplastic resin such as an acrylonitrile butadiene styrene resin (ABS), a polycarbonate resin (PC), and a polyphenyl sulfone resin (PPSF) are also known. In addition, 3D printers using the Selective Laser Sintering (SLS) method or Selective Laser Melting (SLM) method for sintering or melting a resin-substrated powder material or a powder material substrated on a metal such as copper, bronze, titanium, or nickel by irradiation with a high output laser beam (for example, the SLS Series available from 3D Systems, Inc., RaFael 550 available from Aspect, Inc., and the EOSInt Series available from EOS) are also known.

With 3D printers, a resin (ink), which is a material of the shaped article, is used to create a shape. For example, with a resin (ink) that is used in a fused deposition method, a resin filament obtained by forming a thermoplastic resin such as an ABS resin into a filament shape is used. Furthermore, with the fused deposition method, the thermoplastic resin filament is discharged from the 3D printer while being melted, and is laminated onto a base so as to form a desired shape. With the fused deposition method, the resin is discharged onto the base in a molten state, and can therefore be easily molded into the desired shape.

To date, 3D printers have been used in a wide range of fields such as construction, medical care, education, and cutting-edge research with primary use in the manufacturing industry, and in fact, before a product is produced, the individual components are reduced to a size that can be output with a 3D printer, and then output for use in prototyping to verify the design and function, for example. However, in recent years, use of 3D printers in more precise verifications and for the production of actual molded articles of resin has also been expected.

For example, Patent Document 1 discloses that a method for forming a golf ball includes forming a core using a 3D printer, and molding a cover in a surrounding position over the core through at least one of compression molding and injection molding. More specifically, Patent Document 1 discloses a golf ball provided with a core and a cover, formed by a process that includes: forming the core; and molding the cover over the core such that the cover radially surrounds the core through at least one of compression molding and injection molding; wherein forming the core includes: printing a first core portion including a first plurality of concentric shells, printing a second core portion including a second plurality of concentric shells, and fusing the first core portion and the second core portion to form the core.

CITATION LIST

Patent Document

Patent Document 1: JP 2017-502805 T

SUMMARY OF INVENTION

As described in Patent Document 1, it is being investigated that a shaped article formed by using a 3D printer is compressed by using other materials. Here, the compressive strength of a bonding surface causes a problem for cases in which a shaped article formed by using a 3D printer is compressed together with a material containing the other resin. Also, when a filament containing continuous reinforcing fibers is used for shaping with a 3D printer, the orientation of the continuous reinforcing fibers is likely to vary in the obtained shaped article during the compressing process. When the orientation of the continuous reinforcing fibers varies, the appearance of the obtained compressed product becomes inferior.

In order to solve such problems, an object of the present invention is to provide a method for manufacturing a molded article having high compressive strength and excellent appearance by compressing a shaped article obtained using a 3D printer, together with a material containing another resin, and to provide a manufacturing device for the molded article.

The present inventors conducted diligent research to address the above-mentioned problems, and as a result, found that the above problems could be solved by setting the void ratio of the shaped article formed using a 3D printer to a predetermined range. Specifically, the problems described above are solved by the following means <1>, and preferably by the following means <2> to <17>.

<1> A method for manufacturing a molded article, the method including: shaping a filament containing a resin and continuous reinforcing fibers using a 3D printer; and manufacturing a molded article by compressing a second material containing a resin against a shaped article formed by the shaping; wherein the shaped article has a void ratio of from 5 to 30%, where, the void ratio is an average value of [(area of voids)/(photographed area)]×100 (unit: %) of photographs at five locations, obtained by cutting a 1 cm×1 cm sample from the shaped article, subjecting the sample to a CT-scan using X-rays, obtaining photographs of five locations in the thickness direction with respect to obtained cross-sectional data, subjecting the photographs to image analysis, and measuring the area of voids in the shaped article.

<2> The method for manufacturing a molded article according to <1>, wherein the filament contains from 20 to 90 mass % of the resin.

<3> The method for manufacturing a molded article according to <1> or <2>, wherein the filament contains from 10 to 80 mass % of the continuous reinforcing fibers.

<4> The method for manufacturing a molded article according to any one of <1> to <3>, wherein the compressing is performed by applying a pressure of 1 kPa or more.

<5> The method for manufacturing a molded article according to any one of <1> to <4>, wherein the compressing is performed at a temperature of from 50 to 450° C.

<6> The method for manufacturing a molded article according to any one of <1> to <5>, wherein the filament is a UD tape.

<7> The method for manufacturing a molded article according to any one of <1> to <6>, wherein a filament diameter upon discharge is from 0.1 to 3.0 mm.

<8> The method for manufacturing a molded article according to any one of <1> to <7>, wherein the continuous reinforcing fibers included in the filament are carbon fibers.

<9> The method for manufacturing a molded article according to any one of <1> to <8>, wherein the second material is a UD tape.

<10> The method for manufacturing a molded article according to any one of <1> to <9>, wherein the resin contained in the filament and the resin contained in the second material are the same or different types of thermoplastic resins.

<11> The method for manufacturing a molded article according to any one of <1> to <10>, wherein the resin contained in the filament and the resin contained in the second material are the same or different types of polyamide resins.

<12> The method for manufacturing a molded article according to any one of <1> to <11>, wherein the resin contained in the filament and the resin contained in the second material are same or different types of polyamide resins constituted by a constituent unit derived from a diamine and a constituent unit derived from a dicarboxylic acid, and 50 mol % or more of the constituent unit derived from a diamine is derived from xylylenediamine.

<13> The method for manufacturing a molded article according to any one of <1> to <9>, wherein the resin contained in the filament and the resin contained in the second material are the same or different types of thermosetting resins.

<14> The method for manufacturing a molded article according to any one of <1> to <13>, wherein the compressing is performed by a method selected from a press molding method, an injection molding method, a resin transfer molding method, a pultrusion molding method, and an autoclave molding method.

<15> The method for manufacturing a molded article according to any one of <1> to <14>, wherein the shaped article is placed in a mold and subjected to the compressing.

<16> The method for manufacturing a molded article according to any one of <1> to <15>, wherein the compressing is performed after the shaped article is pre-molded.

<17> A manufacturing device for performing the method for manufacturing a molded article described in any one of <1> to <16>, the manufacturing device including: a 3D printer and a compressing machine.

According to the present invention, a method for manufacturing a molded article having high compressive strength and excellent appearance by compressing a shaped article obtained using a 3D printer, together with another material; and a manufacturing device for the same can be provided.

DESCRIPTION OF EMBODIMENTS

The contents of the present invention will be described in detail below. Note that, in the present specification, "from . . . to . . . " is used to mean that the given numerical values are included as the lower limit value and the upper limit value, respectively.

The melting point and glass transition temperature in an embodiment of the present invention are measured in accordance with the description of paragraph [0017] of JP 2016-216661 A, the contents of which are incorporated by reference.

The method for manufacturing a molded article according to an embodiment of the present invention is characterized in that the method includes shaping a filament containing a resin and continuous reinforcing fibers using a 3D printer, and manufacturing a molded article by compressing a second material containing a resin against a shaped article formed by the shaping; and that the shaped article has a void ratio of from 5 to 30%. Such a configuration results in a method for manufacturing a molded article having high compressive strength and excellent appearance.

Figure 1:
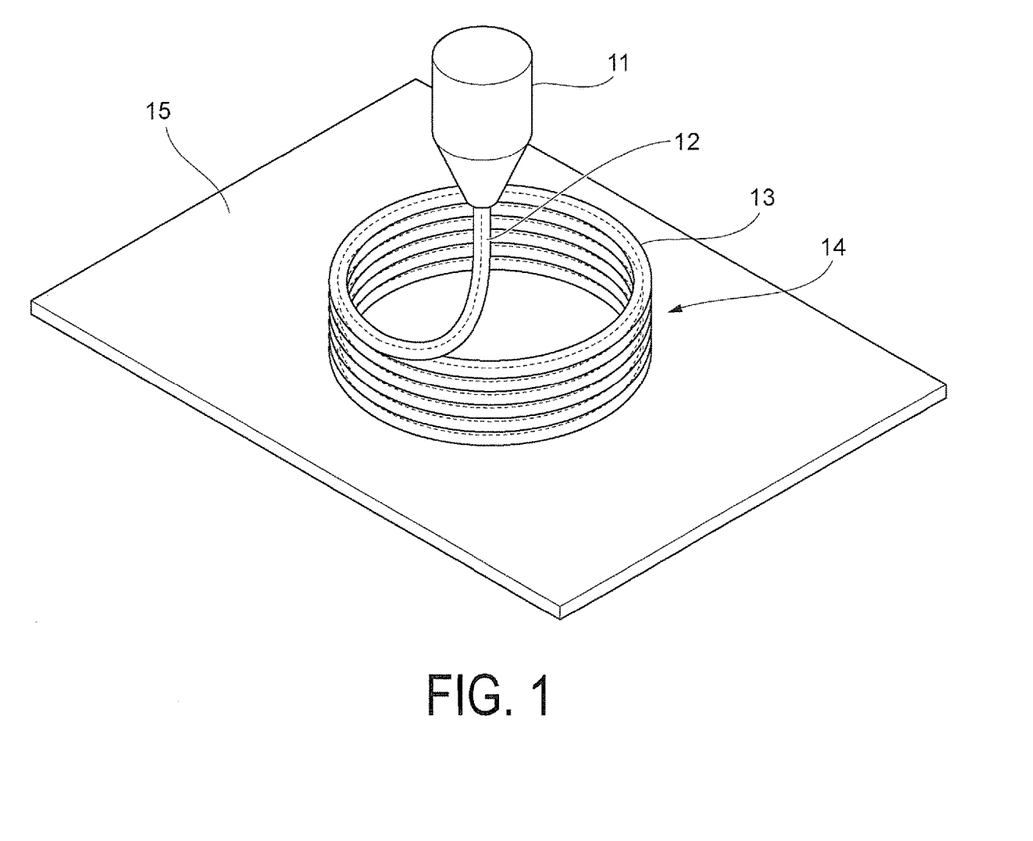
FIG. 1 is a schematic diagram illustrating a state in which a filament containing a resin and continuous reinforcing fibers is shaped using a 3D printer.

That is, as illustrated in FIG. 1, in a case where a filament 12 discharged from a nozzle 11 of a 3D printer contains continuous reinforcing fibers 13, the continuous reinforcing fibers 13 in the resulting shaped article 14 are included in a continuous state along the direction of filament discharge. Therefore, when compression is performed to add another material to the shaped article 14, during compression of a molded article, the orientation of the continuous reinforcing fibers 13 in the shaped article 14 is easily disturbed, leading to a problem that the appearance of the obtained molded article becomes inferior. On the other hand, when an attempt is made to compress in a manner not to disturb the orientation of the continuous reinforcing fibers 13, the compressive strength becomes low. However, in an embodiment of the present invention, the void ratio of the molded article is set to a range from 5 to 30%, whereby the continuous reinforcing fibers 13 are rearranged during the compressing process, and a molded article having high compressive strength and an excellent appearance is successfully provided.

Note that in FIG. 1, the continuous reinforcing fibers 13 are illustrated by dotted lines, but the continuous reinforcing fibers 13 are actually in a continuous state. However, it is not necessary that the continuous reinforcing fibers 13 be continuous without even one interruption in the shaped article 14, and as described in detail below, reinforcing fibers having a number average fiber length of 30 mm or more are used as the continuous reinforcing fibers.

Shaping

The manufacturing method according to an embodiment of the present invention includes shaping a filament that contains a resin and continuous reinforcing fibers using a 3D printer. When shaping is implemented, the shaping is performed such that the void ratio of the shaped article is within a desired range. Here, "void" refers to a space inside a molded article, surrounded in all of directions by the molded article. "Void ratio" refers to the proportion of spaces in the shaped article, and is an average value of [(area of voids)/(photographed area)]×100 (unit: %) of photographs at five locations, obtained by cutting a 1 cm×1 cm sample from the shaped article, subjecting the sample to a CT-scan using X-rays, obtaining photographs of five locations in the thickness direction with respect to obtained cross-sectional data, subjecting the photographs to image analysis, and measuring the area of voids in the shaped article. More specifically, the void ratio is measured in accordance with the method described in the examples below.

For obtaining a shaped article having a desired void ratio, for example, the filament diameter of the filament used in the 3D printer, and in particular, the filament diameter upon discharge is adjusted, or the pitch of the filament to be shaped by the 3D printer is set to within a predetermined range. For example, the pitch in the width direction may be set to a range from 0.05 to 3.0 mm. Additionally, the pitch in the height direction can be set to a range of from 0.02 to 3.0 mm. In particular, the [(filament diameter)/(pitch in the height direction)] upon discharge is preferably adjusted so as to be from 1.0 to 5.0, more preferably adjusted so as to be from 1.1 to 4.0, and even more preferably adjusted so as to be from 1.2 to 3.0. By adjusting the pitch in the height direction to be narrower than the filament diameter in this manner, it becomes easier to effectively achieve the desired void ratio. Note that the pitch in the width direction and the pitch in the height direction are in accordance with the descriptions of the examples described below and FIGS. 2 and 3.

In an embodiment of the present invention, the void ratio of the shaped article is 5% or more, preferably 6% or more, more preferably 7% or more, even more preferably 10% or more, and yet even more preferably 12% or more. In addition, the void ratio is not more than 30%, preferably not more than 28%, more preferably not more than 25%, even more preferably not more than 23%, and yet even more preferably not more than 20%. The effect of the present invention is more effectively exhibited by setting the void ratio to such a range.

In the manufacturing method according to an embodiment of the present invention, the shaped article is formed by discharging the filament from a 3D printer. As an example, as illustrated in FIG. 1, the filament 11 is discharged onto a substrate 15. The substrate 15 may be a base of a 3D printer, or may be laminated to a surface such as a film which is placed on the base of the 3D printer.

It is also preferred that the filament is discharged with one end fixed to the substrate.

When the filament is discharged, the filament may be laminated while moving the substrate 15 so as to form a desired shape, the filament may be laminated while moving the nozzle 11, or the filament may be laminated while moving both the substrate and the nozzle. From the perspective of improving productivity, preferably, the filament is laminated while moving the nozzle.

In addition, the distance between the tip of the nozzle and the substrate may be short (for example, 3 mm or less), or may be long (for example, more than 5 mm), but the tracking performance of the filament is further improved when the distance therebetween is short.

The discharge speed is not particularly limited, but can be, for example, from 0.5 to 100 mm/second, or from 1 to 50 mm/second, and in particular, can be from 1 to 20 mm/second, or from 1 to 10 mm/second. In particular, when the discharge speed is increased, the speed can be set to more than 20 mm/second and not more than 100 mm/second.

The resin contained in the filament is melted in at least one step before, during, and after discharge. Melting means that at least part of the resin contained in the filament melts, preferably means that 80 mass % or more of the resin melts, more preferably means that 95 mass % or more of the resin melts, and even more preferably means that 99 mass % or more of the resin melts.

The melting temperature is not particularly limited as long as the melting temperature is a temperature at which the resin melts, but when the resin is a crystalline thermoplastic resin, the melting temperature is preferably the melting point of the thermoplastic resin +10° C. or higher, more preferably in a range of the melting point of the thermoplastic resin +15 to 60° C., and even more preferably in a range of the melting point of the thermoplastic resin +20 to 40° C. When the resin is an amorphous thermoplastic resin, the melting temperature is preferably the glass transition temperature of the thermoplastic resin +10° C. or higher, more preferably in a range of the glass transition temperature of the thermoplastic resin +15 to 60° C., and even more preferably in a range of the glass transition temperature of the thermoplastic resin +20 to 40° C.

When the resin included in the filament is a thermosetting resin, the melting temperature is preferably 0° C. or higher, and more preferably 10° C. or higher. There are no special restrictions on the upper limit, but the melting temperature is preferably not more than 450° C., and even more preferably not higher than 400° C.

In the present invention, melting is preferably performed by heating the inside of the nozzle when the filament is discharged.

Furthermore, for a case in which the resin is melted after the filament is discharged from the nozzle, the resin is preferably melted by irradiation with a laser. Laser irradiation may be performed after the filament is discharged until the filament is laminated onto the substrate, or may be performed after the filament is laminated onto the substrate, or may be performed at both.

During shaping of the shaped article 14, the resin is not fully cured, and therefore the shaped article 14 may warp or buckle. Therefore, in shaping of the shaped article, preferably, the substrate 15 is also heated. The heating temperature of the substrate is, for example, set to a range from 50 to 100° C., and can also be set to a range from 55 to 90° C. Furthermore, an aspect in which the substrate is not substantially heated is also within the scope of the present invention.

As the 3D printer used in the manufacturing method of the present invention, a 3D printer that can be used in a fused deposition method may be adopted, or a 3D printer that can be used in the SLM method is preferably adopted. Examples of commercially available 3D printers for the fused deposition method include 3D printers of the FORTUS Series, Dimension Series, and uPrint Series available from Stratasys Ltd., and Solidoodle 3 available from Solidoodle LLC. Examples of commercially available 3D printers for the SLM method include the SLS Series available from 3D Systems, Inc., RaFael 550 available from Aspect, Inc., and the EOSInt Series available from EOS.

A support material that supports a spatial portion of the shaped article 14 may be used when manufacturing the shaped article 14. When a support material is used, the filament is discharged onto the surface of the support material. An acrylic resin or the like is used as the support material. However, with an embodiment of the present invention, a high compressive strength can be achieved even in an aspect in which a support material or the like is not used in shaping. The compressive strength can be, for example, 1.2 or more, and can be 1.4 or more, 1.6 or more, or 1.7 or more in terms of the relative ratio. Furthermore, the compressive strength condition can be set to 2.5 or less, 2.3 or less, or 2.2 or less in terms of the relative ratio. More specifically, the compressive strength (relative ratio) is measured in accordance with the method described in the examples below.

The shape of the shaped article that is formed in an embodiment of the present invention is not particularly limited, and, a shaped article having a thin wall for which the thinnest portion is, for example, 5 mm or less, or even 3 mm or less may be manufactured. The lower limit is not particularly limited, and for example, the thickness of the thinnest portion can be set to 0.05 mm or more. The shaped article according to an embodiment of the present invention is normally a three-dimensional structure, but may be a planar structure such as a film or sheet. In particular, the method for manufacturing the molded article according to an embodiment of the present invention is effective when the shaped article has a hollow structure. Examples of such shapes include a round pipe shape with an outer diameter of from 3 to 100 mm, and a hollow spherical shape with an outer diameter of from 10 to 100 mm.

Next, the filament is described. The filament in an embodiment of the present invention is a so-called 3D printer ink that is discharged from a 3D printer.

The filament diameter (diameter) of the 3D printer filament may be set as appropriate according to the application and the nozzle used, but the lower limit of the filament diameter upon discharge is preferably 0.1 mm or more, more preferably 0.2 mm or more, even more preferably 0.3 mm or more, and yet even more preferably 0.5 mm or more. Furthermore, the upper limit of the filament diameter upon discharge is preferably 3.0 mm or less, more preferably 2.5 mm or less, even more preferably 2.0 mm or less, and yet even more preferably 1.0 mm or less. The diameter and cross section of the 3D printer filament can be adjusted according to the shape of the discharge port of the nozzle when a fused deposition method type 3D printer is used. "Upon discharge" refers to immediately after discharge from the nozzle.

The mass per meter of the 3D printer filament is preferably from 0.01 to 40 g, more preferably from 0.1 to 5 g, and even more preferably from 0.5 to 2 g.

The 3D printer filament preferably has an elastic modulus of 10 MPa or more. Such a configuration allows the filament to have some degree of hardness and to easily move inside the 3D printer. In other words, a filament is normally thread-like, and therefore can become entangled or curled, but by setting the elastic modulus to at or above the aforementioned value, the discharge properties can be improved. The lower limit of the elastic modulus of the filament is preferably 10 MPa or more, more preferably 50 MPa or more, even more preferably 1000 MPa or more, and yet even more preferably 1500 MPa or more. The upper limit of the elastic modulus of the filament is preferably 10000 MPa or less, more preferably 8000 MPa or less, and even more preferably 6000 MPa or less, and can also be set to 3500 MPa or less. By setting the elastic modulus to 10000 MPa or less, the filament becomes more pliable, and the discharge property tends to be improved.

The form of the 3D printer filament is not particularly limited, and examples include UD tape, mixed filament yarn, braided yarn made from a resin monofilament and reinforcing fibers, and resin impregnated reinforcing fiber. UD tape and mixed filament yarn are preferable, and UD tape is more preferable. Here, "UD tape" refers to a uni-directional tape.

The 3D printer filament contains a resin. The filament in an embodiment of the present invention preferably contains the resin at an amount of from 10 to 95 mass %, more preferably from 15 to 95 mass %, even more preferably from 20 to 90 mass %, and yet even more preferably from 30 to 80 mass %. The content may be from 30 to 60 mass %, and may be from 30 to 49 mass %. The 3D printer filament may contain only one type of resin or may contain two or more types of resins. In a case where two or more types thereof are contained therein, the total amount is preferably within the range described above.

The resin may be a thermoplastic resin or a thermosetting resin. An embodiment of the resin constituting the filament according to the present invention is an aspect in which a thermoplastic resin accounts for 95 mass % or more of the resin component. Furthermore, another embodiment is an aspect in which a thermosetting resin accounts for 95 mass % or more of the resin component.

As the thermoplastic resin constituting the filament, polyethylene, polypropylene, and other such polyolefin resins; polyamide resins, polyethylene terephthalate, polybutylene terephthalate, and other such polyester resins; and polycarbonate resins; polyoxymethylene resins; polyether ketones, polyether sulfones, thermoplastic polyether imides, and other such thermoplastic resins can be used, and the thermoplastic resin is preferably a polyamide resin. A highly heat resistant thermoplastic resin called a super engineering plastic may also be used as the thermoplastic resin. Examples of super engineering plastics include AURUM (trade name) available from Mitsui Chemicals, Inc., and VICTREX (trade name) PEEK series available from Victrex plc.

The thermoplastic resin used in an embodiment of the present invention may be one or more types.

Examples of the polyamide resin constituting the filament include polyamide 4, polyamide 6, polyamide 11, polyamide 12, polyamide 46, polyamide 66, polyamide 610, polyamide 612, polyhexamethylene terephthalamide (polyamide 6T), polyhexamethylene isophthalamide (polyamide 6I), polyamide 66/6T, polyxylylene adipamide, polyxylylene sebacamide, polyxylylene dodecamide, polyamide 9T, polyamide 9MT, and polyamide 6I/6T.

Among the polyamide resins described above, a polyamide resin containing a constituent unit derived from a diamine and a constituent unit derived from a dicarboxylic acid, and for which 50 mol % or more of the constituent unit derived from a diamine is derived from xylylenediamine (hereinafter, also referred to as "XD-substituted polyamide"), is preferable from the perspectives of moldability and heat resistance.

Furthermore, in a case where the polyamide resin is a mixture, the proportion of the XD-substituted polyamide in the polyamide resin is preferably 50 mass % or more, and more preferably 80 mass % or more.

In the XD-substituted polyamide, preferably 70 mol % or more, more preferably 80 mol % or more, even more preferably 90 mol % or more, and particularly preferably 95 mol % or more, of the constituent unit derived from a diamine is derived from m-xylylenediamine and/or p-xylylenediamine, and preferably 50 mol % or more, more preferably 70 mol % or more, even more preferably 80 mol % or more, yet even more preferably 90 mol % or more, and yet even more preferably 95 mol % or more, of the constituent unit derived from a dicarboxylic acid is derived from an α,ω-linear aliphatic dicarboxylic acid preferably having from 4 to 20 carbon atoms.

Examples of the diamine that can be used as a raw material diamine component of the XD-substrated polyamide, other than m-xylylenediamine and p-xylylenediamine, include aliphatic diamines such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethyl-hexamethylenediamine, and 2,4,4-trimethylhexamethylenediamine; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, and bis(aminomethyl)tricyclodecane; and diamines having aromatic ring(s), such as bis(4-aminophenyl)ether, p-phenylenediamine, and bis(aminomethyl)naphthalene. One type thereof can be used, or two or more types can be mixed and used.

In a case where a diamine other than xylylenediamine is used as the diamine component, the proportion thereof is less than 50 mol %, preferably 30 mol % or less, more preferably from 1 to 25 mol %, and particularly preferably from 5 to 20 mol %, of the constituent unit derived from a diamine.

Examples of the α,ω-linear aliphatic dicarboxylic acid having from 4 to 20 carbon atoms that is preferably used as the raw material dicarboxylic acid component of the polyamide resin include aliphatic dicarboxylic acids, such as succinic acid, glutaric acid, pimelic acid, suberic acid, azelaic acid, adipic acid, sebacic acid, undecanedioic acid, and dodecanedioic acid. One type thereof can be used, or two or more types thereof can be mixed and used. Among these, adipic acid or sebacic acid is preferable, and sebacic acid is more preferable, because the melting point of the polyamide resin is in an appropriate range for molding.

Examples of the dicarboxylic acid component other than the α,ω-linear aliphatic dicarboxylic acid having from 4 to 20 carbon atoms include phthalic acid compounds, such as isophthalic acid, terephthalic acid, and orthophthalic acid; naphthalene dicarboxylic acid compounds, such as 1,2-naphthalene dicarboxylic acid, 1,3-naphthalene dicarboxylic acid, 1,4-naphthalene dicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid, and 2,7-naphthalene dicarboxylic acid. One type thereof can be used, or two or more types thereof can be mixed and used.

In a case where a dicarboxylic acid other than the α,ω-linear aliphatic dicarboxylic acid having from 4 to 20 carbon atoms is used as the dicarboxylic acid component, use of terephthalic acid or isophthalic acid is preferable from the perspectives of molding processability and barrier properties. The proportions of the terephthalic acid and isophthalic acid are each preferably 30 mol % or less, more preferably from 1 to 30 mol %, and particularly preferably from 5 to 20 mol %, of the constituent unit derived from dicarboxylic acid.

Furthermore, besides the diamine component and the dicarboxylic acid component, lactams such as ε-caprolactam and laurolactam, and aliphatic aminocarboxylic acids such as aminocaproic acid and aminoundecanoic acid can also be used as copolymer components constituting the polyamide resin, within a range that does not impair the effect of the present invention.

For details on the XD-substrated polyamide, refer to the description of paragraphs [0013] to [0025] of WO 2016/080185, the contents of which are incorporated by reference in the present specification.

The filament used in an embodiment of the present invention may include an elastomer component in addition to the above-mentioned thermoplastic resin.

As the elastomer component, for example, known elastomers, such as polyolefin-substrated elastomers, diene-substrated elastomers, polystyrene-substrated elastomers, polyamide-substrated elastomers, polyester-substrated elastomers, polyurethane-substrated elastomers, fluorine-substrated elastomers, and silicon-substrated elastomers, can be used. Polyolefin-substrated elastomers and polystyrene-substrated elastomers are preferable. As these elastomers, modified elastomers modified with α,β-unsaturated carboxylic acid and acid anhydrides thereof, acrylamide, and derivatives thereof, in the presence or absence of a radical initiator are also preferable in order to impart compatibility with the polyamide resin.

In a case where the elastomer component is blended in the thermoplastic resin, the blended amount of the elastomer component is preferably from 5 to 25 mass % of the thermoplastic resin.

Furthermore, additives such as antioxidants, stabilizers such as thermal stabilizers, hydrolysis-resistant improving agents, weather resistant stabilizers, matting agents, UV absorbers, nucleating agents, plasticizers, dispersants, flame retardants, antistatic agents, anti-coloration agents, anti-gelling agents, colorants, and release agents, and the like may be added to the thermoplastic resin used in an embodiment of the present invention within a scope that does not impair the object and effect of the present invention. For these details, refer to the description in paragraphs [0130] to [0155] of JP 4894982 B, the contents of which are incorporated by reference in the present specification.

Note that the filament used in an embodiment of the present invention may include a filler besides continuous reinforcing fibers described below, but preferably substantially does not include another filler. "Substantially does not include another filler" means that the content of another filler in the thermoplastic resin composition is 3 mass % or less, and preferably 1 mass % or less.

An example of a preferred embodiment of the filament used in an embodiment of the present invention is an aspect in which 70 mass % or more (preferably 80 mass % or more, and more preferably 90 mass % or more) of the thermoplastic resin is a polyamide resin.

Meanwhile, examples of the thermosetting resin constituting the filament include epoxy resins, vinyl ester resins, unsaturated polyester resins, diallyl phthalate resins, phenolic resins, maleimide resins, cyanate resins, benzoxazine resins, dicyclopentadiene resins, and polyimide resins.

The 3D printer filament contains continuous reinforcing fibers. The filament in an embodiment of the present invention preferably contains the continuous reinforcing fibers at an amount of from 5 to 90 mass %, more preferably from 5 to 85 mass %, even more preferably from 10 to 80 mass %, and yet even more preferably from 20 to 70 mass %, and the content may be from 40 to 70 mass %, and may be from 51 to 70 mass %. One or more types of continuous reinforcing fibers may be included, and when two or more types of continuous reinforcing fibers are included, the total amount is preferably within the range described above.

Examples of the continuous reinforcing fibers used in an embodiment of the present invention include inorganic fibers such as glass fibers, carbon fibers, alumina fibers, boron fibers, ceramic fibers, and metal fibers (steel fibers and the like); and organic fibers, such as plant fibers (including kenaf, bamboo fibers, and the like), aramid fibers, polyoxymethylene fibers, aromatic polyamide fibers, polyparaphenylene benzobisoxazole fibers, and ultra high molecular weight polyethylene fibers. Among these, the continuous reinforcing fibers are preferably at least one type of carbon fiber, aramid fiber, or glass fiber, and more preferably at least one type of carbon fiber or glass fiber. In particular, carbon fibers are preferably used because of the excellent characteristics of being lightweight and high in strength and of having a high elastic modulus. The carbon fibers are preferably a polyacrylonitrile-substrated carbon fiber or a pitch-substrated carbon fiber. Additionally, carbon fibers of plant-derived raw materials, such as lignin and cellulose, can also be used.

The term "continuous reinforcing fibers" means reinforcing fibers having a number average fiber length of 30 mm or more, and such fibers are preferably the ones having a number average fiber length of 50 mm or more. The number average fiber length of the continuous reinforcing fibers used in an embodiment of the present invention is not particularly limited, but from the perspective of achieving excellent molding processability, the number average fiber length is preferably in a range from 1 to 20000 m, more preferably in a range from 100 to 10000 m, and even more preferably in a range from 1000 to 7000 m.

An example of the continuous reinforcing fibers for use in an embodiment of the present invention is a continuous reinforcing fiber bundle in which a plurality of continuous reinforcing fibers are bundled. In the present embodiment, continuous reinforcing fibers having a number average fiber length of 1 m or more are preferable. Another example of continuous reinforcing fibers for use in an embodiment of the present invention is continuous reinforcing fibers with a number average fiber length of from 30 to 150 mm. An example of such continuous reinforcing fibers is "stretch-broken carbon fibers".

As the continuous reinforcing fibers contained in the filament used in an embodiment of the present invention, continuous reinforcing fibers treated with a treatment agent are particularly preferably used. Examples of such treatment agents include bundling agents and surface treatment agents, and those described in paragraphs [0093] and [0094] of JP 4894982 B, the contents of which are incorporated by reference in the present specification, are preferably used.

Specifically, the treatment agent used in an embodiment of the present invention is preferably at least one type selected from epoxy resins, urethane resins, silane-substrated compounds, isocyanate compounds, titanate-substrated compounds, and polyamide resins, more preferably at least one type selected from epoxy resins, urethane resins, silane coupling agents, water-insoluble polyamide resins, and water-soluble polyamide resins, even more preferably at least one type selected from epoxy resins, urethane resins, water-insoluble polyamide resins, and water-soluble polyamide resins, and yet even more preferably a water-soluble polyamide resin.

The amount of the treatment agent is preferably from 0.001 to 1.5 mass %, more preferably from 0.1 to 1.2 mass %, and even more preferably from 0.5 to 1.1 mass %, relative to the amount of the continuous reinforcing fibers.

The total of the resin and the continuous reinforcing fibers preferably accounts for not less than 80 mass %, more preferably not less than 90 mass %, and even more preferably not less than 95 mass %, of the 3D printer filament used in an embodiment of the present invention.

As the method for manufacturing the 3D printer filament used in an embodiment of the present invention, a known method for manufacturing UD tape can be selected.

In addition to the above, other examples of the filament according to an embodiment of the present invention include the mixed filament yarn described in WO 2014/136662, the mixed filament yarn described in WO 2016/039242, the material described in WO 2017/033746, the composite material described in WO 2016/159340, and the fiber-reinforced composite material described in JP 2016-210027 A, and the contents of these publications are incorporated by reference herein.

Compressing

The method of manufacturing a molded article according to an embodiment of the present invention includes compressing a second material that includes a resin against a shaped article that has been formed.

The pressure for compressing can be appropriately determined by the shape and size of the shaped article, the material of the shaped article, and the type of the second material. The pressure for compressing is preferably 1 kPa or more, more preferably 5 kPa or more, and even more preferably 100 kPa or more. The pressure for compressing is preferably 1000000 kPa or less, more preferably 500000 kPa or less, even more preferably 100000 kPa or less, and yet even more preferably 500000 kPa or less.

Furthermore, the temperature during compressing can be appropriately determined depending on the type of resin. For example, the temperature during compressing is preferably 10° C. or higher, more preferably 30° C. or higher, even more preferably 50° C. or higher, and yet even more preferably 60° C. or higher. Furthermore, the temperature during compressing is preferably 550° C. or less, more preferably 500° C. or less, and even more preferably 450° C. or less.

When the resin contained in the second material is a thermoplastic resin having a inciting point, the temperature during compressing is preferably set to a range of from the melting point +1° C. to the melting point +50° C., and more preferably to a range of from the melting point +5° C. to the melting point +40° C.

When the resin contained in the second material is a thermoplastic resin having a glass transition temperature (Tg), the temperature during compressing is preferably set to a range of from Tg+50° C. to Tg+300° C., and more preferably to a range from Tg+60° C. to Tg+250° C.

When the resin contained in the second material is a thermosetting resin having a glass transition temperature (Tg), the temperature during compressing is preferably set to a range of from Tg−100° C. to Tg+100° C., and more preferably to a range from Tg−80° C. to Tg+80° C.

The compressing method is not particularly limited, and examples thereof include press molding methods, injection molding methods, resin transfer molding methods, pultrusion molding methods, and autoclave molding methods. Press molding methods and injection molding methods are more preferable, and press molding methods are even more preferable. By integrally molding the shaped article formed with the 3D printer and the second material molded in this manner, a molded article can be manufactured without using an adhesive and a tacky adhesive.

A first embodiment of the compressing process is an aspect in which the shaped article is placed in a mold and subjected to compressing. Localized reinforcement for the shaped article formed by the 3D printer can be achieved by placing the shaped article in a mold. In addition, the mold in an embodiment of the present invention is preferably made of metal or silicone.

In an embodiment of the present invention, the surface area of the bond site between the shaped article and the second material is preferably from 1 to 10000 mm$^2$, and more preferably from 10 to 2500 mm$^2$, and may be from 100 to 1000 mm$^2$.

The second material used for compressing is not particularly defined as long as it contains a resin. Materials such as films, plates, sheets, tapes, textiles, and knitted materials can be used as forms of the second material. Furthermore, a case where a molten resin or the like is compressed is also included as a preferred form in an embodiment of the present invention. The form of the second material is particularly preferably a film, a plate, a textile, or a knitted material.

As the resin included in the second material, the same resins as those described as the resin used in the 3D printer filament are preferably used. That is, examples include thermoplastic resins and thermosetting resins. Furthermore, the thermoplastic resin is preferably a polyamide resin, and more preferably a polyamide resin constituted by a constituent unit derived from a diamine and a constituent unit derived from a dicarboxylic acid, and for which 50 mol % or more of the constituent unit derived from a diamine is derived from xylylene diamine.

The second material may contain reinforcing fibers. Examples of the reinforcing fibers include short fibers as well as the continuous reinforcing fibers described with respect to the 3D printer filament.

An example of a preferred embodiment of the second material is UD tape. The UD tape is preferably one described with regard to the 3D printer filament. When UD tapes are used for both the 3D printer filament and the second material, the compositions of the UD tapes may be the same or different, but preferably 90 mass % or more of the compositions are common. Such a configuration allows to further improve compressive strength.

In an embodiment of the present invention, aspects are given as examples in which the resin contained in the filament and the resin contained in the second material are the same or different types of thermoplastic resins. Furthermore, an aspect in which the two resins are the same or different types of polyamide resins, and particularly, aspects in which the resins are same or different types of polyamide resins constituted by a constituent unit derived from a diamine and a constituent unit derived from a dicarboxylic acid, and for which 50 mol % or more of the diamine-derived constituent unit is derived from xylylenediamine are given as examples. Furthermore, an aspect in which the resin contained in the filament and the resin contained in the second material are the same or different types of thermosetting resins is also given as an example.

In an embodiment of the present invention, preferably 70 mass % or more, more preferably 80 mass % or more, and even more preferably 90 mass % or more, of the resin contained in the filament and the resin contained in the second material is common. Furthermore, when different types of resins are used for the resin contained in the filament and the resin contained in the second material, a portion of the constituent units of the resins is preferably the same or similar. A particular example is a polyamide resin derived from xylylenediamine and an epoxy resin containing xylylenediamine as a curing agent.

In the method for manufacturing a molded article according to an embodiment of the present invention, the compressing may be performed after pre-molding the shaped article. An example of pre-molding is molding that is performed under conditions where at least one of the temperature or pressure is lower than that in the compressing process.

A specific embodiment of the method for manufacturing a molded article according to an embodiment of the present invention is described.

A first embodiment is an aspect in which a molded article having a reinforced fastener portion with a cylindrical shape is produced. Specifically, a cylindrical member formed using a 3D printer is placed in a mold, and compressed together with a second material, which forms the fastening portion.

A second embodiment is an aspect in which a decorative spherical molded article is produced. Specifically, a spherical member formed using a 3D printer is placed in a mold, and compressed together with a second material having a decorative function.

A third embodiment is an aspect in which a molded article having a plurality of needle-shaped articles is produced. Specifically, a plurality of needle-shaped members formed using a 3D printer are placed in a mold, and compressed together with a second material.

A fourth embodiment is an aspect in which a reinforced molded article is produced in a mesh shape. Specifically, a mesh-shaped member formed by a 3D printer is placed in a mold, and compressed together with a second material. Here, examples of the mesh-shaped member include a structure made from a skeletal frame of the structure. In addition, in the field of rockets, a lattice structure is also included in mesh-shaped members.

Molded articles obtained in an embodiment of the present invention are widely used in fiber-reinforced resin molded articles. The fields of application are not particularly limited, and molded articles obtained in an embodiment of the present invention can be widely used in applications such as components for automobiles and other such transportation devices, general mechanical components, precision mechanical components, electronic and electrical device components, OA device components, building materials and building-related components, medical devices, leisure sporting goods, gaming devices, medical products, household goods such as food packaging films, and defense and aerospace products. Molded articles according to an embodiment of the present invention are also preferably used in prototypes thereof.

The present invention also discloses a manufacturing device for performing the method for manufacturing a molded article, the manufacturing device including a 3D printer and a compressing machine. For these details, the description of the method for manufacturing a molded article described above can be referenced.

EXAMPLES

The embodiments of the present invention are described more specifically below through examples. The materials, usage amounts, proportions, processing contents, processing procedures, and the like described in the examples below may be changed, as appropriate, as long as there is no deviation from the spirit of the present invention. Therefore, the scope of the present invention is not limited to the specific examples described below.

1. Synthesis Example

Synthesis of MPXD10

A reaction vessel equipped with a stirrer, a partial condenser, a total condenser, a thermometer, a dropping funnel, a nitrogen input tube, and a strand die was charged with 10 kg (49.4 mol) of sebacic acid (TA grade, available from Itoh Oil Chemicals Co., Ltd.) and 11.66 g of sodium acetate/sodium hypophosphite monohydrate (molar ratio=1/1.5), and then sufficiently purged with nitrogen, after which the contents were heated to 170° C. and melted while stirring the system under a small stream of nitrogen gas.

Under stirring, 6.647 kg of a mixed xylylenediamine in which the molar ratio of m-xylylenediamine (available from Mitsubishi Gas Chemical Company, Inc.) and p-xylylenediamine (available from Mitsubishi Gas Chemical Company, Inc.) was 70/30 (34.16 mol of m-xylylenediamine, 14.64 mol of p-xylylenediamine) was added dropwise to the molten sebacic acid while the condensed water generated was discharged out of the system, and the internal temperature was continuously increased to 240° C. over 2.5 hours.

After dropwise addition was completed, the internal temperature was increased, and when the temperature reached 250° C., the pressure inside the reaction vessel was reduced. The internal temperature was then further increased, and the melt polycondensation reaction was continued for 20 minutes at 255° C. Then, the inside of the system was pressurized with nitrogen, and the obtained polymer was removed from the strand die and pelletized to obtain a polyamide resin MPXD10.

The melting point of the obtained polyamide resin was 213° C., and the number average molecular weight was 15400.

2. Production of UD Tape

The MPXD10 was dried using a vacuum dryer, and then melt extruded in a single screw extruder having a screw with a diameter of 30 mm, and extrusion molded through a 500 mm wide T die, after which the extrusion molded product was compressed at a roller pressure of 0.4 MPa and a roller temperature of 70° C. using a pair of stainless steel rollers provided with a concave-convex bumpy texture on the surface to mold a film (MPXD10 film) having a bumpy texture on the film surface. A film end part of the MPXD10 film was slit, and a cast film with a thickness of 50 μm and a width of 480 mm was obtained.

Then, the MPXD10 film, and a sheet-like material obtained by arranging in one direction, unidirectionally-arranged polyacrylonitrile-substrated carbon fibers (TORAYCA T300-3000, 3000 filaments, 198 tex, tensile modulus of elasticity: 230 GPa, average fiber diameter: 7 μm) available from Toray Industries, Inc., were compressed at 1 MPa using a plurality of rollers while heating to 220° C., and continuously bonded together, after which the bonded product was cooled with a roller at 40° C. The rollers used for heat compressing were the ones for which the roller surface was coated with a fluororesin. Next, the first 10 cm$^2$ of the UD tape to be wound was secured to a paper core material with tape, and the UD tape was wound with a winding tension of 0.1 MPa, at a winding speed of 1 m/min, a temperature of 25° C., and a relative humidity of 50% while cutting the UD tape to an appropriate width.

The obtained UD tape had a volume ratio of thermoplastic resin to continuous reinforcing fibers of 58:42, a proportion of continuous reinforcing fibers of approximately 54 mass %, and a proportion of resin of approximately 46 mass %.

3. Production of Sheet

The MPXD10 was dried using a vacuum dryer, and then melt extruded in a single screw extruder having a screw with a diameter of 30 mm, and extrusion molded through a 500 mm wide T die, after which the extrusion molded product was compressed at a roller pressure of 0.4 MPa and a roller temperature of 70° C. using a pair of stainless steel rollers provided with a concave-convex bumpy texture on the surface to mold a sheet having a bumpy texture on the surface. The sheet end part was slit to obtain a cast sheet with a thickness of 200 μm and a width of 480 mm.

4. Production of Mixed Filament Yarn

Production of Continuous Thermoplastic Resin Fiber

The thermoplastic resins shown in the tables below were used to form fibers according to the following procedures.

The thermoplastic resin was melt-extruded using a single screw extruder having a 30 mm φ screw, extruded into a strand form from a 60 hole-die, and stretched while being wound with a roll, and a thermoplastic resin fiber bundle wound into a wound body was obtained. The melting temperature was set to a temperature that was 15° C. higher than the melting point of the thermoplastic resin.

Production of Mixed Filament Yarn

Respective fibers were drawn out from a wound body of thermoplastic resin fibers having a length of 1 m or more, and from a wound body of continuous reinforcing fibers having a length of 1 m or more, and the fibers were opened by air blowing while passing through a plurality of guides. While the fibers were being opened, the thermoplastic resin fibers and continuous reinforcing fibers were bundled, and further, air blowing was performed while the bundle was passed through a plurality of guides to make the bundle uniform.

The obtained mixed filament yarn had a fiber fineness of approximately 13000 dtex, a fiber count of approximately 13500 f, a volume ratio of continuous thermoplastic resin fibers to continuous reinforcing fibers of 50:50, a proportion of continuous reinforcing fibers of approximately 69 mass %, and a proportion of resin of approximately 31 mass %.

5. Void Ratio Measurements

The term "void" refers to a space inside the molded article, surrounded in all of directions by the molded article, and was measured as follows.

A 1 cm×1 cm sample was cut from the shaped article, and subjected to a CT-scan using X-rays. Photographs at five locations in the thickness direction were cut out with respect to obtained cross-sectional data, and subjected to image analysis, and the area of the voids in the shaped article was measured. The void ratio was presented as a ratio of (surface area of the voids)/(photographed area) (unit: %). The average of the void ratios of the five cross sectional photographs was used as the void ratio of the shaped article.

To capture images using X-rays, an X-ray CT-scan (TDM 1000H-II, available from Yamato Scientific Co., Ltd.) was used. Image analysis was performed using the image analysis software Azo Kun (available from Asahi Kasei Engineering Corporation), and the surface area was measured.

6. Measurement of Filament Diameter Upon Discharge

The filament diameter upon discharge was measured using the ultra deep color 3D shape measuring microscope VK-9500 (controller section)/VK-9510 (measurement section) (available from Keyence Corporation). A microscope image was obtained from a direction perpendicular to the orientation of the filament constituting the shaped article, and the filament diameter was measured. For cases in which the filament shape was not a perfect circle, the length of the major axis was defined as the filament diameter.

Example 1

The filament (UD tape) obtained above was set in a Solidoodle 3 3D printer (available from Solidoodle), and a portion of the filament was drawn out and secured to the substrate of the 3D printer.

Figure 2:
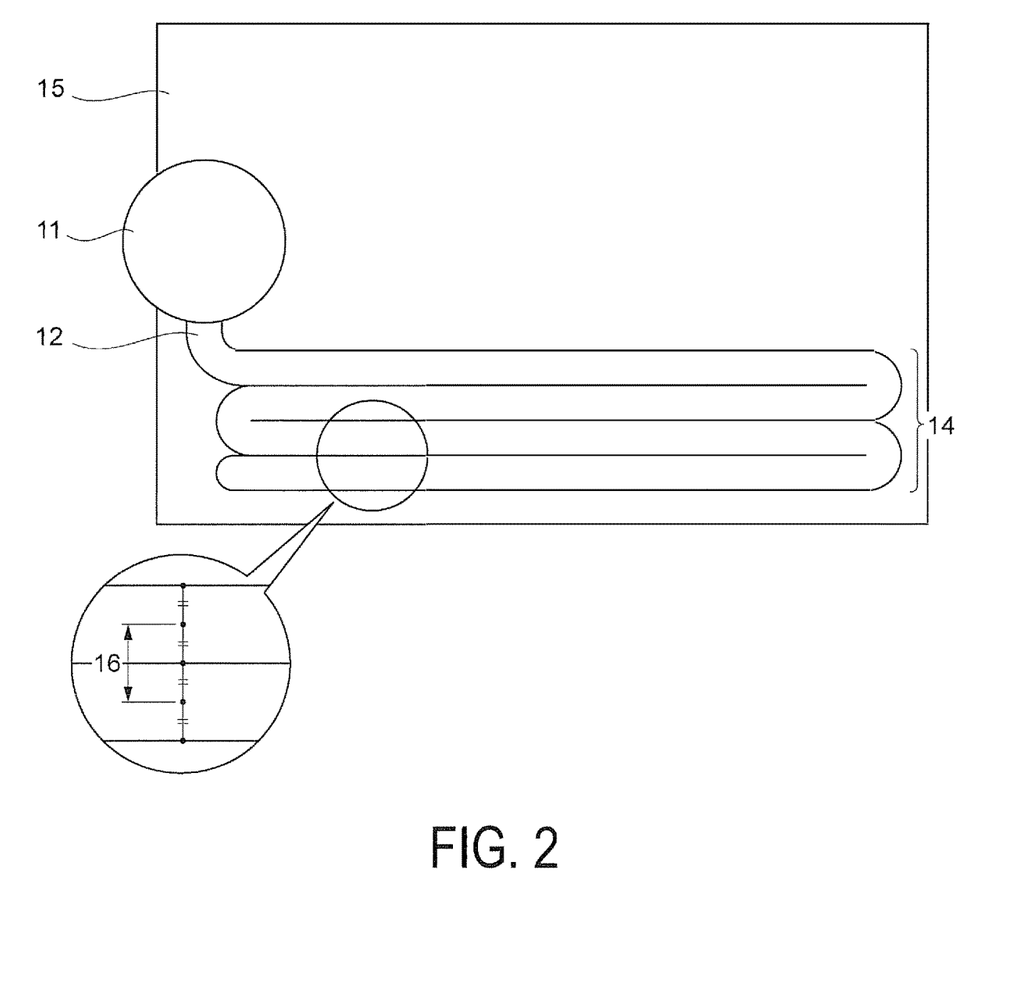
FIG. 2 is a schematic diagram illustrating the pitch in the width direction in an example.
Figure 3:
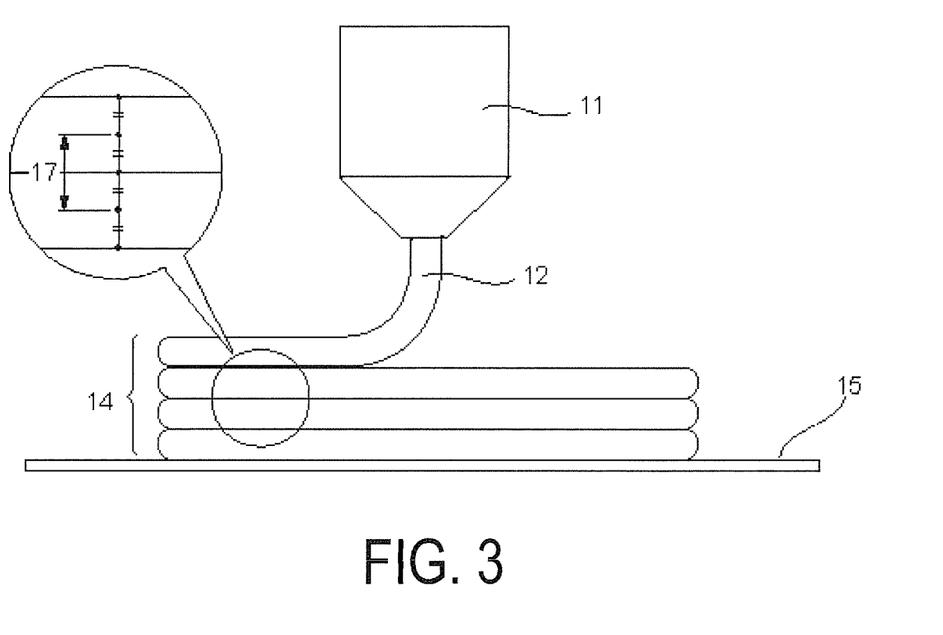
FIG. 3 is a schematic diagram illustrating the pitch in the height direction in an example.

Next, at the discharge temperature (heating temperature inside the nozzle) shown in the table described below, the filament was discharged at a discharge speed of 2 mm/second in a juxtaposed manner onto the substrate so that the pitch in the width direction was 1.0 mm as illustrated in FIG. 2, and a layer-shaped article having a width of 20 mm and a length of 150 mm was formed. Furthermore, as illustrated in FIG. 3, the filament was discharged onto the surface of the layer-shaped article in a layered shape so that the pitch in the height direction was 0.3 mm, and a shaped article was obtained. The filament was repeatedly discharged and laminated so that the thickness of the shaped article was 2 mm. Note that the filament was discharged without driving a drive gear of the Solidoodle 3 (available from Solidoodle). In FIGS. 2 and 3, 11 denotes the 3D printer nozzle, 12 denotes the discharged filament, 14 denotes the shaped article, and 15 denotes the substrate. FIG. 2 is a view from above the substrate (in a direction perpendicular to the substrate surface), and FIG. 3 is a side view of the substrate. The pitch in the width direction (16 in FIG. 2) and the pitch in the height direction (17 in FIG. 3) refer to the distance between centers of two filaments in the width direction and height direction, respectively. More specifically, the pitch in the width direction 16 refers to the distance between the center of a discharged filament in the substrate surface direction and the center of an adjacent discharged filament in the substrate surface direction. The pitch in the height direction 17 refers to the distance between the center of a discharged filament in a direction perpendicular to the substrate surface and the center of an adjacent discharged filament in a direction perpendicular to the substrate surface. In Example 1, the filament diameter of the discharged filament in the height direction was 0.7 mm, and therefore in order to achieve a pitch (distance between centers of the discharged filaments in the height direction) of 0.3 mm, the discharged filament was discharged so as to press against a filament that has been discharged. The filament was similarly discharged so that the pitch in the width direction was 1.0 mm.

The resulting shaped article had a thickness of 2 mm, a width of 20 mm, and length of 150 mm.

The obtained shaped article and the second material were compressed by the following method.

The shaped article was placed in a mold, and next, as a second material, the UD tape obtained above was placed in the mold so as to have the same fiber orientation as the shaped article formed with the 3D printer, and the shaped article and second material were press molded to add a member made of the second material having a thickness of 2 mm, a width of 20 mm, and a length of 150 mm, and a molded article was thereby obtained. The heating temperature at that time was 220° C., and the pressure for compressing was 10000 kPa. The surface area of the bonding site of the member formed from the shaped article and the second material was 400 mm².

Example 2

The same procedures as those of Example 1 were performed with the exception that the carbon fibers were changed to continuous glass fibers (ECG 75 1/0 0.7Z available from Nitto Boseki Co., Ltd., fineness of 687 dtex, fiber count of 400 f) in the UD tape.

Example 3

The same procedures as those in Example 1 were performed with the exception that the UD tape used as the filament was replaced with mixed filament yarn.

Example 4

The same procedures as those in Example 1 were performed with the exception that the resins contained in the UD tape and in the second material were each changed from MPXD10 to polyamide 6 (Grade 1022B, available from Ube Industries, Ltd., melting point of 225° C.).

Example 5

TORAYCA Prepreg P3252S-25 (available from Toray Industries, Inc., made from epoxy resin (glass transition temperature: 112 (° C.), (in accordance with TMA method)) and carbon fibers (T700SC); thermosetting resin:carbon fibers=100 parts by mass:200 parts by mass) was slit to a width of 0.8 mm and processed into a filament with a substantially circular cross-section having a diameter of 0.5 mm. The resulting filament (UD tape) was set in a Solidoodle 3 3D printer (available from Solidoodle), and a portion of the filament was drawn out and secured to the substrate of the 3D printer.

Next, the filament was discharged at a discharge speed of 2 mm/second and a discharge temperature (heating temperature inside the nozzle) shown in the table described below such that the pitch between filaments in the width direction was 1.0 mm, and the pitch between filaments in the height direction was 0.3 mm. Note that the filament was discharged without driving a drive gear of the Solidoodle 3 (available from Solidoodle).

The resulting shaped article had a thickness of 2 mm, a width of 20 mm, and length of 150 mm.

The resulting shaped article and the second material were compressed by the following method.

The resulting shaped article was placed in a mold, and next, as a second material, the TORAYCA Prepreg P3252S-25 was placed in the mold so as to have the same fiber orientation as the shaped article formed with the 3D printer, and the shaped article and the TORAYCA Prepreg P3252S-25 were press molded to add a member made of a second material having a thickness of 2 mm, a width of 20 mm, and a length of 150 mm to the shaped article, and a molded article was thereby obtained. The heating temperature at that time was 130° C., and the pressure for compressing was 1000 kPa.

The surface area of the bonding site of the member formed from the shaped article and the second material was 400 mm².

Example 6

The same procedures as those in Example 1 were performed with the exception that adjustments were made such that the pitch in the height direction was 0.5 mm, and the filament diameter after discharge was 0.6 mm.

Example 7

The same procedures as those in Example 1 were performed with the exception that adjustments were made such that the void ratio was 9%.

Example 8

The same procedures as those in Example 1 were performed with the exception that the pressure for compressing was set to 5000 kPa.

Example 9

The filament (UD tape) was set in a Solidoodle 3 3D printer (available from Solidoodle), and a portion of the filament was drawn out and secured to the substrate of the 3D printer.

Next, the filament was discharged at a discharge speed of 2 mm/second and a discharge temperature (heating temperature inside the nozzle) shown in the table described below such that the pitch in the width direction was 1.0 mm, and the pitch in the height direction was 0.3 mm, and a shaped article was obtained. Note that the filament was discharged without driving a drive gear of the Solidoodle 3 (available from Solidoodle). The resulting shaped article had a thickness of 2 mm, a width of 20 mm, and length of 150 mm.

The resulting shaped article was placed in a mold, and press molding was performed so that pressure was applied to the part other than the surface contacting the second material, and a member formed from the second material having a thickness of 2 mm, a width of 20 mm, and a length 150 mm was added to obtain a pre-molded body. The heating temperature at that time was 205° C., and the pressure for compressing was 200 kPa.

The surface area of the bonding site of the member formed from the shaped article and the second material was 400 mm².

The obtained pre-molded body and the second material were compressed by the following method.

The pre-molded body was placed in a mold, and then as the second material, UD tape was placed in the mold, and the pre-molded body and UD tape were press molded. The heating temperature at that time was 220° C., and the pressure for compressing was 10000 kPa.

Example 10

The same procedures as those in Example 3 were performed with the exception that a mixed filament yarn having a volume ratio of continuous thermoplastic resin fibers to continuous reinforcing fibers of 60:40 was used.

Example 11

The same procedures as those in Example 1 were performed with the exception that a sheet was used in place of the UD tape as the second material.

Example 12

The filament (UD tape) obtained above was set in a Solidoodle 3 3D printer (available from Solidoodle), and a portion of the filament was drawn out and secured to the substrate of the 3D printer.

Next, the filament was discharged at a discharge speed of 2 mm/second and a discharge temperature (heating temperature inside the nozzle) shown in the table described below such that the pitch in the width direction was 1.0 mm, and the pitch in the height direction was 0.3 mm, and a shaped article was obtained. Note that the filament was discharged without driving a drive gear of the Solidoodle 3 (available from Solidoodle). The resulting shaped article had a thickness of 2 mm, a width of 20 mm, and length of 150 mm.

The obtained shaped article and the second material were compressed by the following method.

The shaped article was placed in a mold, and next, a molten resin (MPXD10) was injected as a second material into the mold, and hot press molding was performed to add a member made of the second material having a thickness of 2 mm, a width 20 mm, and a length 150 mm, and a molded article was thereby obtained. The heating temperature at that time was 235° C., and the pressure for compressing was 10000 kPa.

Example 13

The same procedures as those in Example 1 were performed with the exception that a UD tape using polyamide 6 (available from Ube Industries, Ltd., Grade 1022B) was used as the second material in place of MPXD10.

Comparative Example 1

The UD tape described in Example 1 was placed in a mold so as to have the same fiber orientation as the case in which shaping was performed with a 3D printer in Example 1, and was then heated at 250° C. to produce a pre-molded body having a thickness of 2 mm, a width of 20 mm, and a length of 150 mm. Two of the obtained pre-molded bodies were press molded in the same manner as in Example 1. The obtained molded article was evaluated in the same manner as in Example 1.

Comparative Example 2

The same procedures as those in Example 1 were performed with the exception that molding was performed so that the pitch in the height direction was 0.9 mm.

Comparative Example 3

The same procedures as those in Example 1 were performed with the exception that compressing was not performed when the second material was added.

The obtained molded articles were evaluated as follows.
Compressive Strength (Relative Ratio)

Figure 4:
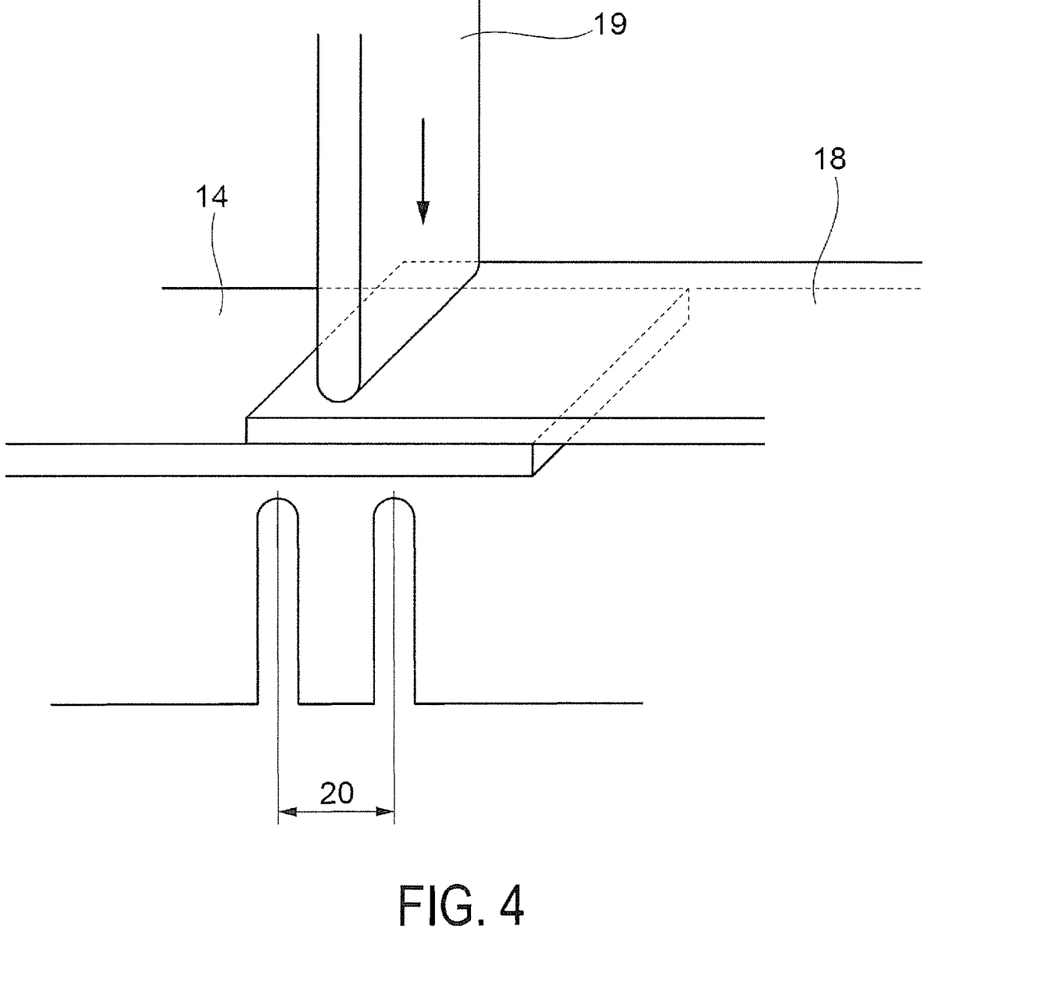
FIG. 4 is a schematic diagram illustrating a method for measuring compressive strength.

As illustrated in FIG. 4, an adhesive surface (20 mm×20 mm=400 mm²) of a molded article A made from the resulting shaped article (thickness of 2 mm, width of 20 mm, and length of 150 mm) and the second material (thickness of 2 mm, width of 20 mm, and length of 150 mm) was each compressed at an inter-span distance of 10 mm and a test speed of 10 mm/minute, and the load was measured. The yield point of the load curve was taken as the compressive strength. In FIG. 4, 14 denotes the shaped article, 18 denotes a member formed from the second material, 19 denotes the site at which compression was applied, and 20 denotes the inter-span distance.

An Instron universal tester (Type 4206) available from Instron, was used to measure compression and load.

Furthermore, a molded article B shown in the reference examples in the table below was produced for calculating relative ratios. That is, the raw material of a member "a" was placed in the mold, and then pressed for 15 minutes at 1 MPa and a temperature of the resin melting point +15° C., and the member "a" having nearly the same shape as that of the shaped article formed using the 3D printer was obtained. The member "a" was produced in the same manner with the exception that the temperature was set to 130° C. for the epoxy resin. When the raw material of the member "a" contained continuous reinforcing fibers, the material was disposed so as to have the same fiber orientation as the shaped article formed with the 3D printer for the corresponding molded article A.

The obtained member "a" was used, a raw material of a member "b" was placed in the mold and press molded to add the member "b" with a thickness of 2 mm, a width of 20 mm, and a length of 150 mm, and thereby a molded article B was obtained. The processing conditions were as shown in the tables below. The surface area of the bonding site of the members "a" and "b" was 400 mm$^2$. When the raw material of the member "b" contained continuous reinforcing fibers, the material was disposed so as to have the same fiber orientation as that of the site derived from the second material of the corresponding molded article A.

The relative ratio of the compressive strength of the molded article A obtained by compressing the shaped article and the second material, with respect to the obtained molded article B (reference example) for calculating the relative ratio was presented. Relative Ratio=Molded Article A/Molded Article B Appearance The obtained molded articles were visually observed and evaluated as follows.

A: The joint of the molded article was not conspicuous, and surface smoothness was good.

B: The joint of the molded article was not conspicuous, but the surface smoothness was somewhat poor.

C: The joint of the molded article was conspicuous, and the surface smoothness was somewhat poor.

D: The surface smoothness was poor.

TABLE 1

|  |  | Example 1 | Example 2 | Example 3 | Example 4 |
|---|---|---|---|---|---|
| Filament | Filament form | UD Tape | UD Tape | Mixed filament yarn | UD Tape |
|  | Resin constituting the filament | MPXD10 | MPXD10 | MPXD10 | Polyamide 6 |
|  | Type of continuous reinforcing fibers contained in the filament | CF | GF | CF | CF |
| Shaping method | Temperature for filament discharge (° C.) | 250 | 250 | 250 | 245 |
|  | Discharge pitch (mm) in height direction | 0.3 | 0.3 | 0.3 | 0.3 |
|  | Filament diameter (mm) upon discharge | 0.7 | 0.7 | 0.7 | 0.7 |
|  | Void ratio (%) of shaped article | 13 | 14 | 19 | 15 |
| Second Material | Form of second material | UD Tape | UD Tape | UD Tape | UD Tape |
|  | Resin contained in second material | MPXD10 | MPXD10 | MPXD10 | Polyamide 6 |
|  | Type of reinforcing fibers contained in second material | CF | GF | CF | CF |
| Compressing | Compressing Method | Press molding | Press molding | Press molding | Press molding |
|  | Pressure for compressing (kPa) | 10000 | 10000 | 10000 | 10000 |
|  | Temperature for compressing (° C.) | 220 | 220 | 220 | 230 |
| Evaluation | Compressive Strength (relative ratio) | 2.0 | 1.7 | 2.0 | 1.7 |
|  | Reference for compressive strength | Reference Example 1 | Reference Example 4 | Reference Example 6 | Reference Example 2 |
|  | Appearance | A | A | A | A |

|  |  | Example 5 | Example 6 | Example 7 | Example 8 |
|---|---|---|---|---|---|
| Filament | Filament form | UD Tape | UD Tape | UD Tape | UD Tape |
|  | Resin constituting the filament | Epoxy resin | MPXD10 | MPXD10 | MPXD10 |
|  | Type of continuous reinforcing fibers contained in the filament | CF | CF | CF | CF |
| Shaping method | Temperature for filament discharge (° C.) | 50 | 250 | 250 | 250 |
|  | Discharge pitch (mm) in height direction | 0.3 | 0.5 | 0.3 | 0.3 |
|  | Filament diameter (mm) upon discharge | 0.7 | 0.6 | 0.9 | 0.7 |
|  | Void ratio (%) of shaped article | 11 | 21 | 9 | 13 |
| Second Material | Form of second material | UD Tape | UD Tape | UD Tape | UD Tape |
|  | Resin contained in second material | Epoxy resin | MPXD10 | MPXD10 | MPXD10 |
|  | Type of reinforcing fibers contained in second material | CF | CF | CF | CF |
| Compressing | Compressing Method | Press molding | Press molding | Press molding | Press molding |
|  | Pressure for compressing (kPa) | 1000 | 10000 | 10000 | 5000 |
|  | Temperature for compressing (° C.) | 130 | 220 | 220 | 220 |

TABLE 1-continued

| Evaluation | Compressive Strength (relative ratio) | 1.6 | 2.1 | 1.6 | 1.8 |
|---|---|---|---|---|---|
| | Reference for compressive strength | Reference Example 3 | Reference Example 1 | Reference Example 1 | Reference Example 1 |
| | Appearance | A | B | A | A |

TABLE 2

| | | Example 9 | Example 10 | Example 11 | Example 12 |
|---|---|---|---|---|---|
| Filament | Filament Form | UD Tape | Mixed filament yarn | UD Tape | UD Tape |
| | Resin constituting the filament | MPXD10 | MPXD10 | MPXD10 | MPXD10 |
| | Type of continuous reinforcing fibers contained in the filament | CF | CF | CF | CF |
| Shaping Method | Temperature for filament discharge (° C.) | 250 | 250 | 250 | 250 |
| | Discharge pitch (mm) in height direction | 0.3 | 0.3 | 0.3 | 0.3 |
| | Filament diameter (mm) upon discharge | 0.7 | 0.7 | 0.7 | 0.7 |
| | Void ratio (%) of shaped article | 6 | 19 | 13 | 13 |
| Second Material | Form of second material | UD Tape | UD Tape | Sheet | Molten resin |
| | Resin contained in second material | MPXD10 | MPXD10 | MPXD10 | MPXD10 |
| | Type of reinforcing fibers contained in second material | CF | CF | None | None |
| Compressing | Compressing Method | Press Molding (with pre-molding) | Press molding | Press molding | Injection molding |
| | Pressure for compressing (kPa) | 10000 | 10000 | 10000 | 10000 |
| | Temperature for compressing (° C.) | 220 | 220 | 220 | 235 |
| Evaluation | Compressive Strength (relative ratio) | 1.5 | 1.9 | 1.3 | 1.3 |
| | Reference for compressive strength | Reference Example 1 | Reference Example 6 | Reference Example 7 | Reference Example 8 |
| | Appearance | A | A | A | B |

| | | Example 13 | Comparative Example 1 | Comparative Example 2 | Comparative Example 3 |
|---|---|---|---|---|---|
| Filament | Filament Form | UD Tape | UD Tape | UD Tape | UD Tape |
| | Resin constituting the filament | MPXD10 | MPXD10 | MPXD10 | MPXD10 |
| | Type of continuous reinforcing fibers contained in the filament | CF | CF | CF | CF |
| Shaping Method | Temperature for filament discharge (° C.) | 250 | — | 250 | 250 |
| | Discharge pitch (mm) in height direction | 0.3 | — | 0.9 | 0.3 |
| | Filament diameter (mm) upon discharge | 0.7 | — | 0.5 | 0.7 |
| | Void ratio (%) of shaped article | 15 | 1 | 32 | 13 |
| Second Material | Form of second material | UD Tape | UD Tape | UD Tape | UD Tape |
| | Resin contained in second material | Polyamide 6 | MPXD10 | MPXD10 | MPXD10 |
| | Type of reinforcing fibers contained in second material | CF | CF | CF | CF |
| Compressing | Compressing Method | Press molding | Press molding | Press molding | Press molding |
| | Pressure for compressing (kPa) | 10000 | 10000 | 10000 | 0.01 |
| | Temperature for compressing (° C.) | 230 | 220 | 220 | 220 |
| Evaluation | Compressive Strength (relative ratio) | 1.7 | 0.8 | 1.8 | 0.4 |
| | Reference for compressive strength | Reference Example 5 | Reference Example 1 | Reference Example 1 | Reference Example 1 |
| | Appearance | A | A | C | D |

TABLE 3

| | | Reference Example 1 | Reference Example 2 | Reference Example 3 | Reference Example 4 |
|---|---|---|---|---|---|
| Member "a" | Form of raw material of member "a" | UD Tape | UD Tape | UD Tape | UD Tape |
| | Resin contained in member "a" | MPXD10 | Polyamide6 | Epoxy resin | MPXD10 |
| | Type of reinforcing fibers contained in member "a" | CF | CF | CF | GF |
| | Void ratio (%) of Member "a" | 1 | 1 | 1 | 1 |
| Member "b" | Form of raw material of member "b" | UD Tape | UD Tape | UD Tape | UD Tape |
| | Resin included in member "b" | MPXD10 | Polyamide6 | Epoxy resin | MPXD10 |
| | Type of reinforcing fibers contained in member "b" | CF | CF | CF | GF |

TABLE 3-continued

| Compressing | Compressing Method | Press molding | Press molding | Press molding | Press molding |
|---|---|---|---|---|---|
| | Compression pressure (kPa) | 10000 | 10000 | 10000 | 10000 |
| | Compression temperature (° C.) | 220 | 230 | 130 | 220 |

| | | Reference Example 5 | Reference Example 6 | Reference Example 7 | Reference Example 8 |
|---|---|---|---|---|---|
| Member "a" | Form of raw material of member "a" | UD Tape | Mixed filament yarn | UD Tape | UD Tape |
| | Resin contained in member "a" | MPXD10 | MPXD10 | MPXD10 | MPXD10 |
| | Type of reinforcing fibers contained in member "a" | CF | CF | CF | CF |
| Member "b" | Void ratio (%) of Member "a" | 1 | 1 | 1 | 1 |
| | Form of raw material of member "b" | UD Tape | UD Tape | Sheet | Molten resin |
| | Resin included in member "b" | Polyamide 6 | MPXD10 | MPXD10 | MPXD10 |
| | Type of reinforcing fibers contained in member "b" | CF | CF | None | None |
| Compressing | Compressing Method | Press molding | Press molding | Press molding | Injection molding |
| | Compression pressure (kPa) | 10000 | 10000 | 10000 | 10000 |
| | Compression temperature (° C.) | 230 | 220 | 220 | 235 |

With the manufacturing method according to an embodiment of the present invention, molded articles exhibiting high compressive strength and excellent appearance were obtained (Examples 1 to 13). In contrast, for cases in which the void ratio was outside the scope according to an embodiment of the present invention (Comparative Examples 1 and 2), either the appearance or the compressive strength was inferior. Furthermore, when compression was not implemented when adding the second material (Comparative Example 3), the compressive strength was low, and the appearance was inferior.

REFERENCE SIGNS LIST 11 3D printer nozzle
12 Discharged filament
13 Continuous reinforcing fiber
14 Shaped article
15 Substrate
16 Pitch in width direction
17 Pitch in height direction
18 Member formed from second material
19 Compressed site
20 Inter-span distance

The invention claimed is:

1. A method for manufacturing a molded article, the method comprising:
shaping a filament comprising a resin and continuous reinforcing fibers using a 3D printer to form a shaped article; and
manufacturing a molded article by placing the shaped article in a mold and compressing a second material comprising a resin against the shaped article;
wherein the shaped article has a void ratio of from 5 to 30%, where, the void ratio is an average value of [(area of voids)/(photographed area)]×100 (unit: \ %) of photographs at five locations, obtained by cutting a 1 cm×1 cm sample from the shaped article, subjecting the sample to a CT-scan using X-rays, obtaining photographs of five locations in a thickness direction with respect to obtained cross-sectional data, subjecting the photographs to image analysis, and measuring the area of voids in the shaped article.

2. The method for manufacturing a molded article according to claim 1, wherein the resin contained in the filament makes up 20 to 90 mass % of the filament.

3. The method for manufacturing a molded article according to claim 1, wherein the filament comprises from 10 to 80 mass % of the continuous reinforcing fibers.

4. The method for manufacturing a molded article according to claim 1, wherein the compressing is performed by applying a pressure of 1 kPa or more.

5. The method for manufacturing a molded article according to claim 1, wherein the compressing is performed at a temperature of from 50 to 450° C.

6. The method for manufacturing a molded article according to claim 1, wherein the filament is a UD tape.

7. The method for manufacturing a molded article according to claim 1, wherein a diameter of the filament upon discharge is from 0.1 to 3.0 mm.

8. The method for manufacturing a molded article according to claim 1, wherein the continuous reinforcing fibers included in the filament are carbon fibers.

9. The method for manufacturing a molded article according to claim 1, wherein the second material is a UD tape.

10. The method for manufacturing a molded article according to claim 1, wherein the resin contained in the filament and the resin contained in the second material are the same or different types of thermoplastic resins.

11. The method for manufacturing a molded article according to claim 1, wherein the resin contained in the filament and the resin contained in the second material are the same or different types of polyamide resins.

12. The method for manufacturing a molded article according to claim 1, wherein the resin contained in the filament and the resin contained in the second material are the same or different types of polyamide resins constituted from a constituent unit derived from a diamine and a constituent unit derived from a dicarboxylic acid, and 50 mol % or more of the constituent unit derived from the diamine is derived from xylylenediamine.

13. The method for manufacturing a molded article according to claim 1, wherein the resin contained in the filament and the resin contained in the second material are the same or different types of thermosetting resins.

14. The method for manufacturing a molded article according to claim 1, wherein the compressing is performed by a method selected from a group consisting of a press molding method, an injection molding method, a resin transfer molding method, a pultrusion molding method, and an autoclave molding method.

15. The method for manufacturing a molded article according to claim 1, wherein the compressing is performed after the shaped article is pre-molded.

* * * * *